US012361285B2

(12) United States Patent
Lewis

(10) Patent No.: US 12,361,285 B2
(45) Date of Patent: Jul. 15, 2025

(54) METHODS, SYSTEMS AND COMPUTER PROGRAM PRODUCTS FOR MEDIA PROCESSING AND DISPLAY

(71) Applicant: Automobilia II, LLC, Coral Gables, FL (US)

(72) Inventor: Lucinda Lewis, Burbank, CA (US)

(73) Assignee: AUTOMOBILIA II, LLC, Coral Gables, FL (US)

( * ) Notice: Subject to any disclaimer, the term of this patent is extended or adjusted under 35 U.S.C. 154(b) by 717 days.

(21) Appl. No.: 17/609,911

(22) PCT Filed: May 8, 2020

(86) PCT No.: PCT/US2020/032149
§ 371 (c)(1),
(2) Date: Nov. 9, 2021

(87) PCT Pub. No.: WO2020/227651
PCT Pub. Date: Nov. 12, 2020

(65) Prior Publication Data
US 2022/0398827 A1 Dec. 15, 2022

Related U.S. Application Data

(60) Provisional application No. 62/845,546, filed on May 9, 2019.

(51) Int. Cl.
*G06N 3/08* (2023.01)
*G06V 10/44* (2022.01)
(Continued)

(52) U.S. Cl.
CPC ............. *G06N 3/08* (2013.01); *G06V 10/454* (2022.01); *G06V 10/764* (2022.01); *G06V 10/82* (2022.01); *G06V 20/20* (2022.01); *G06V 20/56* (2022.01)

(58) Field of Classification Search
CPC .......... G06N 3/08; G06N 3/042; G06N 3/044; G06N 3/048; G06N 3/045; G06N 5/02;
(Continued)

(56) References Cited

U.S. PATENT DOCUMENTS

| 6,175,787 B1 | 1/2001 | Breed |
| 7,660,437 B2 | 2/2010 | Breed |

(Continued)

FOREIGN PATENT DOCUMENTS

| WO | 2018065549 A1 | 4/2018 |
| WO | 2018197835 A1 | 11/2018 |

OTHER PUBLICATIONS

Madler, Mark R., "Alternate Futures," San Fernando Valley Business Journal, pp. 9-11, Mar. 18, 2019.
(Continued)

*Primary Examiner* — Michael S Osinski
(74) *Attorney, Agent, or Firm* — Wasserbauer Law LLC; Nicholas E. Blanton, Esq.; Damian G. Wasserbauer, Esq.

(57) ABSTRACT

The present disclosure relates generally to methods, systems and computer program products for classifying and identifying input data using neural networks and displaying results (e.g., images of vehicles, vehicle artifacts and geographical locations dating from the 1880s to present day and beyond). The results may be displayed on displays or in virtual environments such as on virtual reality, augmented reality and/or mixed-reality devices.

20 Claims, 7 Drawing Sheets

(51) Int. Cl.
*G06V 10/764* (2022.01)
*G06V 10/82* (2022.01)
*G06V 20/20* (2022.01)
*G06V 20/56* (2022.01)

(58) Field of Classification Search
CPC .... G06V 10/454; G06V 10/764; G06V 10/82; G06V 20/20; G06V 20/56; G06V 2201/08; G06F 16/433; G06F 16/434; G06F 16/438; G06F 16/90332; G06F 18/24143; G06Q 30/018; G06Q 30/0241; H04L 63/02
See application file for complete search history.

(56) References Cited

U.S. PATENT DOCUMENTS

| | | | |
|---|---|---|---|
| 7,817,104 B2 | 10/2010 | Ryu et al. | |
| 7,849,491 B2 | 12/2010 | Perlman | |
| 8,843,543 B2 | 9/2014 | Damman et al. | |
| 8,924,415 B2 | 12/2014 | Thomas | |
| 9,818,249 B1 | 11/2017 | Fraser et al. | |
| 9,892,133 B1 | 2/2018 | Biessmann et al. | |
| 10,042,604 B2 | 8/2018 | Fallon | |
| 10,127,250 B2 | 11/2018 | Dingman et al. | |
| 10,140,553 B1 | 11/2018 | Vasisht et al. | |
| 10,192,163 B2 | 1/2019 | Wang | |
| 10,198,671 B1* | 2/2019 | Yang | G06V 10/768 |
| 10,269,179 B2 | 4/2019 | Fein et al. | |
| 10,417,499 B2* | 9/2019 | Katz | G06V 20/46 |
| 10,423,874 B2* | 9/2019 | Mao | G06N 3/044 |
| 10,540,378 B1* | 1/2020 | Hsiao | G06F 18/24 |
| 10,691,899 B2* | 6/2020 | Lubbers | G06N 3/04 |
| 11,055,557 B2* | 7/2021 | Chatterjee | G06F 16/3334 |
| 11,227,182 B2* | 1/2022 | Li | G06N 3/08 |
| 11,257,217 B2* | 2/2022 | Shlens | G06N 3/044 |
| 11,270,168 B1* | 3/2022 | Otten | G06F 16/55 |
| 11,409,997 B2* | 8/2022 | Yoon | G06N 3/04 |
| 11,410,033 B2* | 8/2022 | Neves | G06V 30/194 |
| 11,417,082 B2* | 8/2022 | Zheng | G06Q 30/0643 |
| 11,475,665 B1* | 10/2022 | Lin | G06V 10/758 |
| 11,544,510 B2* | 1/2023 | Chaudhari | G06V 30/413 |
| 11,568,178 B2* | 1/2023 | Boulanger | G06N 3/08 |
| 11,636,330 B2* | 4/2023 | Krishnan | G06N 3/045 |
| | | | 706/20 |
| 11,741,368 B2* | 8/2023 | Redford | G06V 10/751 |
| 11,783,384 B2* | 10/2023 | Porter | G06V 20/10 |
| | | | 382/190 |
| 11,790,632 B2* | 10/2023 | Xu | G06T 7/11 |
| | | | 382/225 |
| 11,853,961 B1* | 12/2023 | Bergamo | G06V 10/454 |
| 11,978,106 B2* | 5/2024 | Jain | G06F 18/2413 |
| 12,001,948 B1* | 6/2024 | Teig | G06N 20/00 |
| 12,039,648 B2* | 7/2024 | Charlton | G06V 20/36 |
| 2012/0116728 A1 | 5/2012 | Shear et al. | |
| 2013/0066936 A1 | 3/2013 | Krishnan et al. | |
| 2014/0340423 A1 | 11/2014 | Taylor et al. | |
| 2015/0269244 A1 | 9/2015 | Qamar et al. | |
| 2017/0039456 A1* | 2/2017 | Saberian | G06N 3/045 |
| 2017/0046613 A1* | 2/2017 | Paluri | G06N 3/045 |
| 2017/0061250 A1* | 3/2017 | Gao | G06V 20/70 |
| 2017/0098153 A1* | 4/2017 | Mao | G06N 3/045 |
| 2017/0200092 A1* | 7/2017 | Kisilev | G06N 3/08 |
| 2017/0270625 A1* | 9/2017 | Kereth | G06Q 50/184 |
| 2018/0084310 A1 | 3/2018 | Katz et al. | |
| 2018/0204120 A1* | 7/2018 | Rei | G06N 3/04 |
| 2018/0293552 A1 | 10/2018 | Zhang et al. | |
| 2019/0005670 A1 | 1/2019 | DeTone et al. | |
| 2019/0050520 A1 | 2/2019 | Alvarez et al. | |
| 2019/0102676 A1 | 4/2019 | Nazari et al. | |
| 2019/0102954 A1 | 4/2019 | Bastian et al. | |
| 2019/0114395 A1 | 4/2019 | Lenchner et al. | |
| 2019/0114489 A1* | 4/2019 | Jackson | G06V 10/82 |
| 2019/0138826 A1* | 5/2019 | Ghafarianzadeh | G06V 20/10 |
| 2019/0278994 A1* | 9/2019 | Bumpas | G06N 3/045 |
| 2019/0311188 A1* | 10/2019 | Qing | G06V 10/82 |
| 2019/0311210 A1* | 10/2019 | Chatterjee | G06N 3/045 |
| 2020/0005075 A1* | 1/2020 | Porter | G06Q 30/0278 |
| 2020/0133961 A1* | 4/2020 | Wroblewski | G06N 3/08 |
| 2020/0302234 A1* | 9/2020 | Walters | G06F 16/9035 |
| 2020/0342646 A1* | 10/2020 | Wang | G06N 3/045 |
| 2020/0356592 A1* | 11/2020 | Yada | G06F 16/538 |
| 2021/0012145 A1* | 1/2021 | Chaudhari | G06V 30/19167 |
| 2021/0133510 A1* | 5/2021 | Boulanger | G06F 18/241 |
| 2021/0142097 A1* | 5/2021 | Zheng | G06V 10/761 |
| 2021/0248400 A1* | 8/2021 | Cronje | G06V 20/597 |
| 2021/0256365 A1* | 8/2021 | Wang | G06F 16/583 |
| 2021/0382937 A1* | 12/2021 | Jie | G06F 16/55 |
| 2021/0383153 A1* | 12/2021 | Zhang | G06V 10/82 |
| 2022/0012297 A1* | 1/2022 | Basu | G06N 3/045 |
| 2022/0012526 A1* | 1/2022 | Pan | G06F 16/53 |
| 2022/0012533 A1* | 1/2022 | Yue | G06N 3/045 |
| 2022/0019849 A1* | 1/2022 | Kim | G06N 3/08 |
| 2022/0019853 A1* | 1/2022 | Hamedi | G06N 3/08 |
| 2022/0207079 A1* | 6/2022 | Shebl | G06V 10/761 |
| 2022/0233129 A1* | 7/2022 | Liu | G06N 3/044 |
| 2023/0162488 A1* | 5/2023 | Boulanger | G06V 10/82 |
| | | | 382/157 |
| 2023/0222792 A1* | 7/2023 | Badr | H04N 23/633 |
| | | | 348/169 |

OTHER PUBLICATIONS

Takahashi, Dean, "Gaikai isn't concerned about OnLive's fundamental patent on cloud gaming," VentureBeat, Dec. 15, 2010.
Gordo, Albert and Larlus, Diane, "Beyond instance-level image retrieval: Leveraging captions to learn a global visual representation for semantic retrieval." In Proceedings of the IEEE conference on computer vision and pattern recognition, pp. 6589-6598. 2017.
Wang, Xiaohui, "Virtual Reality of 3D Digital Factory Based on Coastal Environment," Journal of Coastal Research, vol. 83, pp. 507-512, Coconut Creek, Florida, USA (2018).
International Search Report for PCT Patent Application No. PCT/US2020/032149 Issued on Aug. 4, 2020 5 pages.
White Paper "The Content Authenticity Initiative" Setting the Standard for Digital Content Attribution, Rosenthol, L., Parsons, A., Scouten, E., Athora, J., MacCormack, B., England, P., Levallee, M., Dotan, J., Hanna, S., Farid, H. Gregory, S (Witness) Aug. 2020, 28 pages.

* cited by examiner

METHODS, SYSTEMS AND COMPUTER PROGRAM PRODUCTS FOR MEDIA PROCESSING AND DISPLAY

CROSS REFERENCE TO RELATED APPLICATIONS

This patent application claims priority to, and the benefit of, PCT/US2020/032149 filed on May 8, 2020, entitled "Methods, Systems And Computer Program Products for Media Processing And Display," which in turn claims priority to, and the benefit of, U.S. Provisional Pat. App. No. 62/845,546 filed on May 9, 2019, entitled "Neural Network for Identifying Vehicles and/or Providing Artificial Intelligence"; each prior application is incorporated by reference herein in its entirety.

BACKGROUND

Cultural knowledge about one of mankind's most significant inventions, the automobile, is deeply fragmented and not easily searchable. Today, a user may see an object, such as a vehicle, driving down the road and wonder what it is, or an autonomous vehicle driving on a freeway may have a need to identify objects such as vehicles in its vicinity to learn information (e.g., vehicle make, model, year, stopping distance, etc.) and any equipment on board (e.g., communication devices, computer systems, etc.). Such information is currently unauthenticated, fragmented, dispersed, and not readily available in searchable form.

As society becomes increasingly digitalized, benefits have emerged in augmenting human intelligence with artificial intelligence (AI) to answer questions with curated knowledge. The market of automobile information is segmented and incoherent, with bits of information gathered by each segment without any relationship to each other and, thus, the information is not readily searchable. Each market segment has different needs, e.g., a user may have an instant need to identify certain vehicles, auto-related architecture and/or cultural artifacts out of interest whereas an autonomous vehicle may have a need to identify other vehicles in its vicinity and access their capabilities.

In 2018, the automotive advertising segment exceeded $38 trillion, exclusive of advertising for travel and food and automotive repair. The automotive advertising sector is the second largest advertising sector in the overall advertising marketplace. The largest customers are advertisers for new car buyers interested in the heritage of an automotive brand, the collectible car enthusiast market, the automotive parts market, insurance, travel, media archives and libraries with unidentified assets, and consumers with an unidentified photo album showing family vehicles. Additional commercial opportunities reside with government, security, law enforcement, and the entertainment industry.

Existing platforms are unable to sufficiently identify vehicles. These platforms can only make inferences from unauthenticated data. Anyone looking to authenticate a vehicle using these platforms can spend hours and still be uncertain of the exact make, model and year. These platforms have no verifiable source of automotive data and little hope of authoritatively identifying cars. It is difficult and frustrating to credibly authenticate automobiles by searching the Internet or asking vehicle owners; significant knowledge is fading from human memory.

There is a need for methods, systems and computer program products that allow a user to identify and search objects such as vehicles, while simultaneously building provenance and preserving knowledge around such objects and their cultural history, to instantly and properly identify objects by training artificial intelligence tools, to preserve cultural history, to promote historic places influenced by the vehicle's evolution, to establish automotive provenance based on first-hand historical records, to celebrate and educate users about objects (e.g., vehicles), to learn from history and help shape mobility's evolution, to explore human-computer interactions and to address the automotive advertising market. The systems, methods and computer program products described herein can quickly and accurately identify objects such as vehicles using authenticated data and provide an armature for social data to accrue around any object, building provenance around a subject that has lacked the tools to easily authenticate knowledge, e.g., cars and their impact on culture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
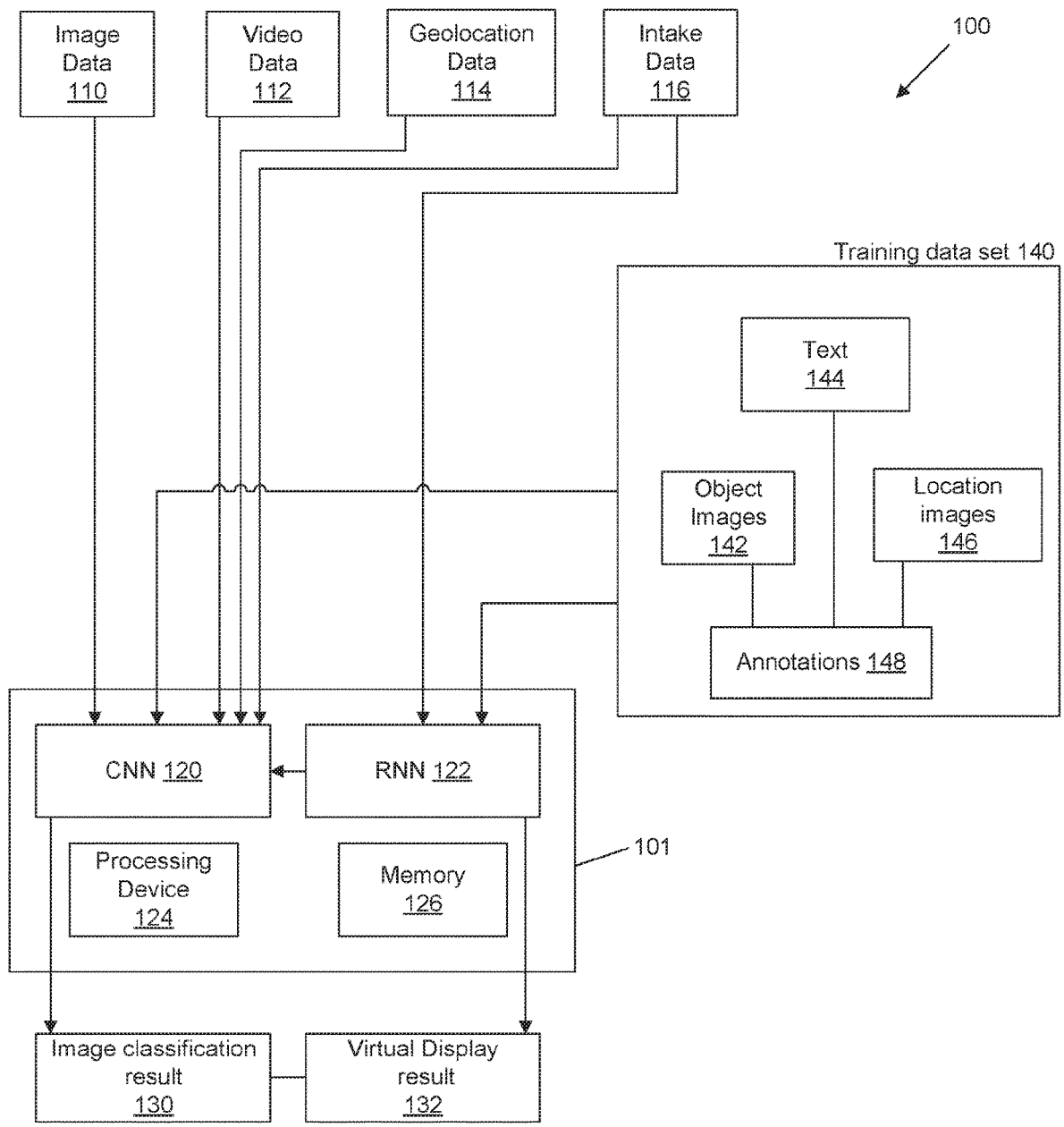
FIG. 1 schematically illustrates an example system for image processing and data analysis, in accordance with one or more aspects of the present disclosure.

Described herein are methods, systems and computer program products for media classification and identification and for displaying results on a display (e.g., a cell phone, a monitor, an augmented reality apparatus, a mixed reality apparatus). While the systems and methods are described with respect to vehicles, vehicle artifacts and geographical locations, the systems and methods are broadly applicable to any objects. In example implementations, the systems and methods may relate to buildings (e.g., architecture), clothing, bridges, tools, highways, mountains, parks, rivers, cities, cars converted to homes and so on. Thus, the systems and methods described herein may be applied to a wide variety of physical objects that may involve various combinations of multiple imaging and/or other image capturing mechanisms.

The present disclosure overcomes the above-noted and other deficiencies by providing systems and methods for image processing and data analysis that may be utilized for identifying, classifying, researching and analyzing objects including, but not limited to vehicles, vehicle parts, vehicle artifacts, cultural artifacts, geographical locations, etc. To identify all of the objects in a photo, alone or in combination with a geographical location and/or a cultural heritage object, and then to associate a narrative with them represents a unique challenge. The converse of this too—the identification of historic places and objects (e.g. Statue of Liberty) alone, or in combination with vehicles—forms a broad descriptive visual narrative that illustrates innovative mapping from natural language processing (NLP) to multi-label image classification and identification.

In example implementations, a repository of photos, videos, keywords and captions of automobiles of proven provenance, with user narratives and comments, can be used to train a unique AI pipeline to map the information to a target space for image classification. For example, given an uploaded user image, the AI models may create the most appropriate summary of the relevant sections of the asset, and perform a multi-labeled classification of the image into the appropriate model of, for example, car manufacturer and year. In the case of an image containing multiple cars and cultural artifacts (e.g., glove compartments, spokes, steering wheels, vehicle lifts, etc.), there may be the additional task of establishing bounding-boxes around each of the recognized objects, and creating summary text appropriate to the image as a whole.

Likewise, the converse problem of taking a vehicle description, i.e., "Show me Prototypes", and enriching it with AI assisted discovery into a proprietary database of high quality copyrighted images, represents a journey where the feature-vectors comprise the NLP embeddings of the narratives. The target space may be comprised of clusters of automotive images that share attributes; for example, the query may map to a cluster of experimental cars from a particular decade. This may involve a single machine learning (ML) pipeline where RNN (LSTM/GRU) and BERT-derived attention models interact with CNN-architectures for image classification and Siamese Neural Networks (SNNs) for correct identifications. A collaborative user verification process involving crowd wisdom can be used to improve the accuracy of image-augmentation such that users can point out errors and suggest corrections. Should certain annotations be erroneous and users mark them so, such data will feed into the next round of neural architecture training.

In certain implementations, the systems and methods described herein may perform pixel-level analysis of images (and/or videos) in order to yield images, videos and/or virtual environments (e.g., augmented reality, mixed reality, virtual reality etc.) of vehicles, vehicle artifacts (e.g., images of vehicle tools, feature elements such as goggles, tachometers, wheel spokes, gas cans, etc.) and/or geographical locations. The systems and methods described herein may further determine whether images or videos input to the media processing system contain features that match one or more features of an image, video and/or geographical location of stored in a memory. In implementations, the systems and methods produce a result that comprises the closest matching data (e.g., having the highest probability score based on a cross-entropy function) identified in the training data set and/or database repository. The result may include an image of a vehicle together with text information about the vehicle such as a history, make, model, year, etc. The systems and methods may additionally yield historical information about one or more vehicle and/or geographical location and such information may be displayed in a virtual environment. In certain implementations, the systems and methods as described herein may also be implemented in an autonomous vehicle to capture images and/or video of surrounding vehicles on the road and to produce a result indicating the size, make, model and on-board equipment of the surrounding vehicles. In an example implementation, an autonomous vehicle incorporating the systems and methods described herein can be trained for "platooning." An example of "platooning" is where a vehicle operating in a self-driving or semi-autonomous mode, analyzes other vehicles in its vicinity to determine, for example, which vehicles may be capable of vehicle-to-vehicle (V2V) communication, other equipment on board, the estimated stopping distance of each vehicle and surrounding environmental objects such as children, balls, bicycles, tumbleweeds, etc. The autonomous vehicle may then communicate with the V2V vehicles to maintain a safe speed and distance to those vehicles, that is, the vehicles may move harmoniously together and may stop together at a traffic lights. Any vehicles in the vicinity that are not capable of V2V may be accounted for as an unknown variable. In other implementations, platooning may involve recognition by the autonomous vehicle of structures that are capable of communicating with the vehicle in a vehicle-to-infrastructure (V2I) configuration. If the infrastructure is equipped with methods and systems as described herein, it may time or adjust the traffic lights to enhance platooning of V2I vehicles taking into consideration the variables of vehicles that are not equipped for V2I communication.

The systems and methods described herein have the benefit of being trained using a proprietary database comprising high-quality, digital copyrighted images of vehicles, vehicle artifacts and/or geographic sites (e.g., historical sites, cultural sites), such that the accuracy of the results produced by the disclosed systems and methods is improved over known methods of researching and analyzing vehicles, vehicle artifacts and/or geographical locations. The database may further include videos, embedded metadata and text. The database may itself be copyrighted. Because the database and data assets (e.g., images, videos, text, etc.) are themselves copyrighted, they form a body of authenticated data on which the neural networks can be trained.

The systems and methods described herein utilize a convolutional neural network (CNN) or a combination of both a CNN and a recurrent neural network (RNN), which form a part of a media processing system. The CNN may process one or more of image data (e.g., containing images, for example, of vehicles, vehicle artifacts, landscapes, etc.), video data (e.g., videos of vehicles, videos of historical sites, etc.), geolocation data (e.g., from a global positioning system) or intake data (e.g., text queries entered via a user interface, voice queries, natural language queries, etc.) to perform classification and with respect to vehicle information, vehicle artifact information, geographical location, etc. and/or to yield the probability of one or more image, video, geolocation and/or intake query matching significant features associated with a vehicle, a vehicle artifact and/or geographical location. The returned images, videos and/or virtual environment may be annotated and/or layered (e.g., overlaid, underlaid) with historical, design, mechanical, etc. information in the form of, for example, text, audio and video.

The RNN processes unstructured data, for example, natural language search queries and/or voice inputs to provide natural language processing (NLP). The unstructured data is transformed into structured data, which is fed to the CNN and processed as described above. In example implementations, the neural network architecture creates a hybridization of natural language processing (RNN) with image classification and identification techniques (CNN) for the purposes of preserving and accumulating data around a key subject area of historical and cultural interest.

A CNN is a computational model based on a multi-staged algorithm that applies a set of pre-defined functional transformations to one or more input (e.g., image pixels) and then utilizes the transformed data to perform, for example, classification, identification, image recognition, pattern recognition, etc. A CNN may be implemented as a feed-forward neural network (FFNN) in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. In addition to image processing, the CNN may be used for other input types such as text, audio and video. In implementations, images may be input to a media processing system as described herein and the CNN processes the data. For example, if a user inputs a picture of a Ford Thunderbird automobile, the media processing system may output an image of a Ford Thunderbird together with the make, model, year, history and any known contextual information surrounding the photo and background.

In an illustrative example, a CNN may include multiple layers of various types, including convolution layers, non-linear layers (e.g., implemented by rectified linear units (ReLUs)), pooling layers, and classification (fully-connected) layers. A convolution layer may extract features from the input image by applying one or more learnable pixel-level filters to the input image. In an illustrative example, a pixel-level filter may be represented by a matrix of integer values, which is convolved across the dimensions of the input image to compute dot products between the entries of the filter and the input image at each spatial position, thus producing a feature map that represents the responses of the filter at every spatial position of the input image. The convolution filters are defined at the network training stage based on the training dataset to detect patterns and regions that are indicative of the presence of significant features within the input image.

A non-linear operation may be applied to the feature map produced by the convolution layer. In an illustrative example, the non-linear operation may be represented by a rectified linear unit (ReLU) which replaces with zeros all negative pixel values in the feature map. In various other implementations, the non-linear operation may be represented by a hyperbolic tangent function, a sigmoid function, or by other suitable non-linear function.

A pooling layer may perform subsampling to produce a reduced resolution feature map while retaining the most relevant information. The subsampling may involve averaging and/or determining maximum value of groups of pixels.

In certain implementations, convolution, non-linear, and pooling layers may be applied to the input image multiple times prior to the results being transmitted to a classification (fully-connected) layer. Together these layers extract the useful features from the input image, introduce non-linearity, and reduce image resolution while making the features less sensitive to scaling, distortions, and small transformations of the input image.

The output from the convolutional and pooling layers represent high-level features of the input image. The purpose of the classification layer is to use these features for classifying the input image into various classes. In an illustrative example, the classification layer may be represented by an artificial neural network that comprises multiple neurons. Each neuron receives its input from other neurons or from an external source and produces an output by applying an activation function to the sum of weighted inputs and a trainable bias value. A neural network may include multiple neurons arranged in layers, including the input layer, one or more hidden layers, and the output layer. Neurons from adjacent layers are connected by weighted edges. The term "fully connected" implies that every neuron in the previous layer is connected to every neuron on the next layer.

The edge weights are defined at the network training stage based on the training dataset. In an illustrative example, all of the edge weights are initialized to random values. For every input in the training dataset, the neural network is activated. The observed output of the neural network is compared with the desired output specified by the training data set, and the error is propagated back to the previous layers of the neural network, in which the weights are adjusted accordingly. This process is repeated until the output error is below a predetermined threshold.

The CNN may be implemented in a SNN configuration. A SNN configuration contains two or more identical sub-network components. In implementations, not only is the architecture of the subnetworks identical, but the weights are shared among them as well. SNNs learn useful data descriptors, which may be used to compare the inputs (e.g., image data, video data, input data, geolocation data, etc.) of the subnetworks. For example, the inputs may be image data with CNNs as subnetworks.

The CNN may be implemented in a Generative Adversarial Network (GAN), which refers to two networks working together. A GAN can include any two networks (e.g., a combination of FFNNs and CNNs), with one tasked to generate content and the other tasked to judge content. The discriminating network receives either training data or generated content from the generative network. The ability of the discriminating network to correctly predict the data source is then used as part of the error for the generating network. This creates a form of competition where the discriminator gets better at distinguishing real data from generated data and the generator learns to become less predictable to the discriminator. Even quite complex noise-like patterns can become predictable, but generated content similar in features to the input data is harder to learn to distinguish. The dynamics between the two networks need to be balanced; if prediction or generation becomes too good compared to the other, the GAN will not converge as there is intrinsic divergence.

A RNN may be described as a FFNN having connections between passes and through time. A RNN receives not just the current input it is fed, but also what it has perceived previously in time. In a RNN, neurons can be fed information not only from a previous layer, but from a previous pass. A string of text or picture can be fed one pixel or character at a time, so that the time dependent weights can be used for what came before in the sequence, not actually from what happened a specific time (e.g., x seconds) before. The RNN may be implemented as a Long Short-Term Memory (LFTM), which helps preserve the error, back-propagating it through layers and time. A LSTM includes information outside of the normal flow of the RNN in a gated cell. Information can be written to, stored in, or read from a cell, similar to data in a computer's memory. The cell can make decisions about when to allow reads, writes and erasures, and what to store via gates that open and close. These gates are analog, implemented with element-wise multiplication by sigmoids (i.e., all in the range of 0-1).

The RNN may be implemented with Bidirectional Encoder Representations from Transformers (BERT) to perform NLP tasks including inter alia question answering and natural language inference. BERT, which uses a Transformer-based language model, is a language representation model that provides accuracy for NLP tasks. A Transformer, in an encoding step, can use learned word embedding to convert words, in one-hot-vector form, into word embedding vectors; for each word-embedding vector, there is one output vector. BERT and its variants and Transformers, alone or in any combination with RNNs, are suitable for NLP tasks according to implementations herein.

Natural Language Processing (NLP) is the ability of a computer program to process and generate human language as spoken and/or written. In implementations, one or more recurrent neural network (RNN) is constructed to perform NLP (e.g., including text classification and text generation). In implementations, a neural network has layers, where each layer includes either input, hidden or output cells in parallel. In general two adjacent layers are fully connected (i.e., every neuron forms one layer to every neuron to another layer). For example, the network can have two input cells and one output cell, which can be used to model logic gates.

Augmented reality, which refers to a combination of a virtual environment and virtual reality, combines real-world images and virtual-world images such as computer graphic images. Augmented reality is a semi-digital experience. In implementations of augmented reality, an image capturing device (e.g., a camera, a phone, a video recorder, etc.) that receives real images and a display device (e.g., a head mounted display that can display both real images and virtual images) are used together. Using augmented reality, a vehicle can be superimposed over a geographical location, for example, that can be associated with a particular date, time and/or weather condition. Lines can be drawn over an image of a vehicle to identify certain features and or parts, which may or may not be associated with a particular design type, time of history and/or cultural trend.

Virtual reality is a fully digital experience that creates an immersive environment where humans and computers can effectively interact and communicate by enhancing human-computer conversation skills using a variety of input and output techniques. Such techniques include the use of, for example, head-mounted displays, data gloves, or motion capture systems. These techniques receive data regarding variations in the position of a user by monitoring head, hand or other movements (e.g., position, directions, etc.), and transmit the data to a computer, which simulates (e.g., in a 3D coordinate space) the size and depth of an object within the viewing angle of the user.

Mixed reality refers to the merging of the real world with a virtual world to create a new environment where physical and digital objects interact with one another in real-time. In mixed reality, a real image can be captured using an image capturing device (e.g., a camera) and the direction the user faces within the environment is based on the captured real image. The relationship between the user's position and the position of a predetermined object is determined, and data obtained as a result of the calculation is displayed in a virtual space such that the data is laid over the captured real world image. Mixed reality is typically implemented using an image capturing device together with a display device.

FIG. 1 schematically illustrates an example system 100 for image processing and data analysis, in accordance with one or more aspects of the present disclosure. As schematically illustrated by FIG. 1, the CNN 120 and optionally an RNN 122 together with a processing device 124 and a memory 126 form an media processing system 101. The media processing system 101 may be employed to process image data 110, video data 112, geolocation data 114 and input data 116 to produce an image classification result 130 and/or a virtual display result 132. The image data 110 may include one or more digital images, for example, captured by a camera or scanned, that may be stored in a memory. The video data 112 may include one or more digital videos, for example, captured by an audiovisual recording device or a dubbing device, that may be stored in a memory. The geolocation data 114 may include longitude, latitude, country, region, historical or cultural place (e.g., Brooklyn Bridge), city, postal/zip code, time zone, way point, cell tower signal, etc. information from, for example, a global positioning system (GPS), entry to a user interface and/or other navigation system. The input data 116 may include structured data such as keyword search query input via a user interface and/or unstructured data input via the user interface. The unstructured data may include written or spoken natural language.

The CNN 120 may be employed to process the image data 110, the video data 112, the geolocation data 114 and the structured input data 116 to produce an image classification result 130 and/or a virtual display result 132, for example, with respect to vehicle information (e.g., a make, model, year, convertible sedan, sports utility vehicle or SUV, prototype, etc.), vehicle artifacts (e.g., tools, a steering wheel, a lift, spokes, etc.) and/or a geographical location (e.g., a cultural site, a historical site, a landmark, etc.). The RNN 122 may process the unstructured data of the input data 116 (i.e., natural language processing) to produce structured data. The structured data may be fed from the RNN 122 to the CNN 120 for processing as described herein. In an illustrative example, the CNN 120 may correlate the image data 110, video data 112, geolocation data 114, input data 116 and structured data from the RNN 112 with images and data from a database (e.g., a propriety database of high quality copyrighted images and other works) in order to yield the probabilities of, for example, one or more image containing matching significant image features associated with a vehicle and/or a geographical location. The media processing system 101 may also return as part of the image classification result 130 historical, mechanical, cultural and other information with respect to the vehicle and/or geographical location.

The CNN 120 and the RNN 122 may be pre-trained using a comprehensive and precise training data set 140 that comprises inter alia non-published data, published data, images, videos, text (e.g., stories, news articles about various (e.g., thousands) vehicles, memoirs, out-of-print books, etc.) and/or geographical locations. For every vehicle or geographical location, the training data set may include multiple pixel-level, optionally annotated, vehicle images 142 and geographical images 146 and also may include related text 144 (e.g., histories, stories, descriptions, books, articles, drawings, sketches, etc.). The training data set 140 according to implementations herein may be a unique, comprehensive and proprietary body comprising copyrighted images, videos and text (e.g., history from the $20^{th}$ Century surrounding vehicles, books off copyright, personal memoirs about vehicles, stories about racing, metals used, the brass era), built over many decades, that contains approximately 500,000 assets and verifies provenance through its records of timely copyright registrations at the Library of Congress. The copyrighted works (i.e., authenticated data) identify inter alia automobiles and their impact on world culture including the time, place, historical context and significant background architecture captured in the media assets. Initially, the training data set 140 may be comprised in a copyrighted database where all of the assets contained within the training data set are copyrighted and thus authenticated. In further implementations, the training data set 140 may expand to include data input by users and further data assets that are not copyright registered, where such additional assets may be authenticated by other means whether scholarly (e.g., citations and research) or by using SNNs according to embodiments herein. The secondary twin will run a regression against the CNN. While the training data set 140 is comprehensive and precise when used in the systems and methods described herein, it will grow and evolve with more provenance authenticated data.

In certain implementations, training of the CNN 120 may involve activating the CNN 120 for every set of input images in the training dataset. The observed output (e.g., an image produced by the CNN 120) is compared with the desired output (e.g., the expected image) specified by the training data set, the error is calculated, and parameters of the CNN 120 are adjusted. This process is repeated until the output error is below a predetermined threshold.

In certain implementations, training of the RNN 122 may involve activating the RNN 120 for every set of unstructured data inputs in the training dataset. The observed output (e.g., a structured query produced by the CNN 120) is compared with the desired output (e.g., the expected query) specified by the training data set, the error may be calculated, and the parameters of the RNN 122 are adjusted accordingly. In implementations, this process may be repeated until the output error is below a predetermined threshold. In implementations using the RNN and deep learning models, the media processing system 101 may function and draw inferences from cross-related data.

The media processing system 101 may produce a virtual display result 132 in a virtual reality, augmented reality and/or mixed reality environment. In one illustrative example, one or more images, videos, descriptions, audio recordings, etc. may be layered onto an image captured by an image capture device (e.g., a camera, video recorder, etc.) and presented on a display. For example, a user may employ an image capture device (e.g., a cell phone) to capture an image in real time and the media processing system 101 may overlay or underlay images, videos and text onto the captured image as being viewed in an output device (e.g., a head-mounted display).

In one illustrative example, the CNN may be trained to identify automobiles. The media processing system 101 may process data 110, 112, 114, 116 to identify automobiles and preserve vehicle history by allowing a user to query the media processing system 101 to learn facts and view photos of a specific vehicle. In implementations, the media processing system 101 may provide and provoke the curation of historical information surrounding the returned images (e.g., as a part of the image classification result 130). Multiple query types may be supported including, for example, photo uploads (CNN) and voice inputs (RNN) to query the models.

Figure 2:
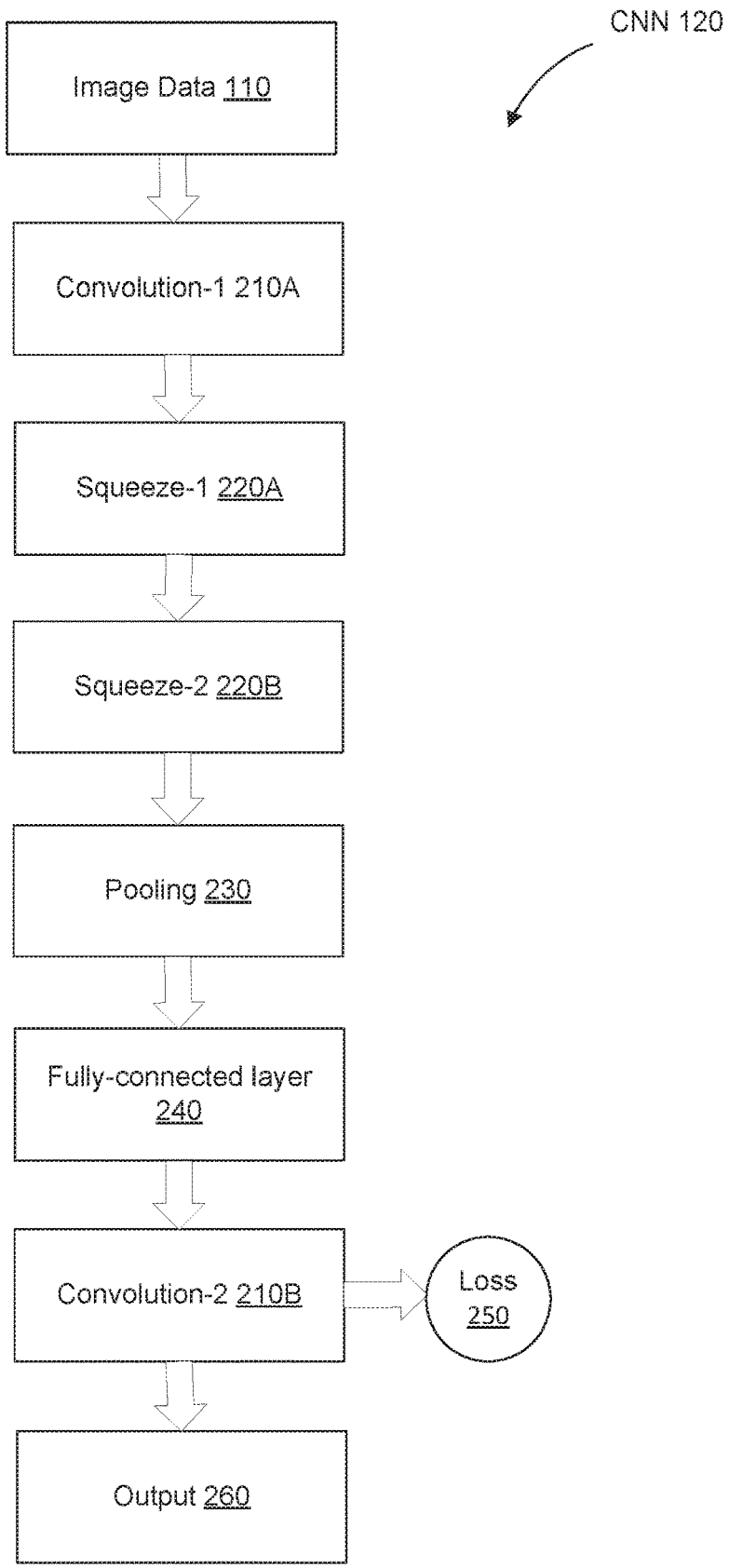
FIG. 2 schematically illustrates an example structure of a convolutional neural network (CNN) that may be employed to process data input to an example system for media classification and identification, in accordance with one or more aspects of the present disclosure.

FIG. 2 schematically illustrates an example structure of a CNN 120 that may be employed to process image data 110, video data 112, geolocation data 114 and input data 116 in order to produce an image classification result 130 and/or a virtual display result 132, in accordance with one or more aspects of the present disclosure. In certain implementations, acquired images may be pre-processed, e.g., by cropping, which may be performed in order to remove certain irrelevant parts of each frame. In an illustrative example, images having the resolution of 1024×1024 pixels may be cropped to remove 100-pixel wide image margins from each side of the rectangular image. In another illustrative example, a car may be outlined and isolated from noisy, non-contributory background elements.

As schematically illustrated by FIG. 2, the CNN 120 may include a first convolution layer 210A that receives image data 110 containing one or more images. The first convolution layer 210A is followed by squeeze layers 220A and 220B and a pooling layer 230, which is in turn followed by fully-connected layer 240 and a second convolution layer 210B. The second convolution layer 210B outputs one or more image 260 corresponding to the one or more input image of the image data 110 and may further produce the loss value 250 reflecting the difference between the produced data and the training data set. In certain implementations, the loss value may be determined empirically or set at a pre-defined value (e.g., 0.1).

In certain implementations, the loss value is determined as follows:

$$\text{loss} = \Sigma (x-y)^2 (\frac{1}{2} + \max(x,y)),$$

where x is the pixel value produced by the second convolution layer 210B and y is the value of the corresponding output image pixel.

Each convolution layer 210A, 210B may extract features from a sequence of input images from the input data 110, by applying one or more learnable pixel-level filters to a three-dimensional matrix representing the sequence of input images. The pixel-level filter may be represented by a matrix of integer values, which is convolved across the dimensions of the input image to compute dot products between the entries of the filter and the input image at each spatial position, to produce a feature map representing the responses of the first convolution layer 210A at every spatial position of the input image. In an illustrative example, the first convolution layer 210A may include 10 filters having the dimensions of 2×2×2. The second convolution layer 210B may merge all the values produced by previous layers in order produce a matrix representing a plurality of image pixels.

Figure 3:
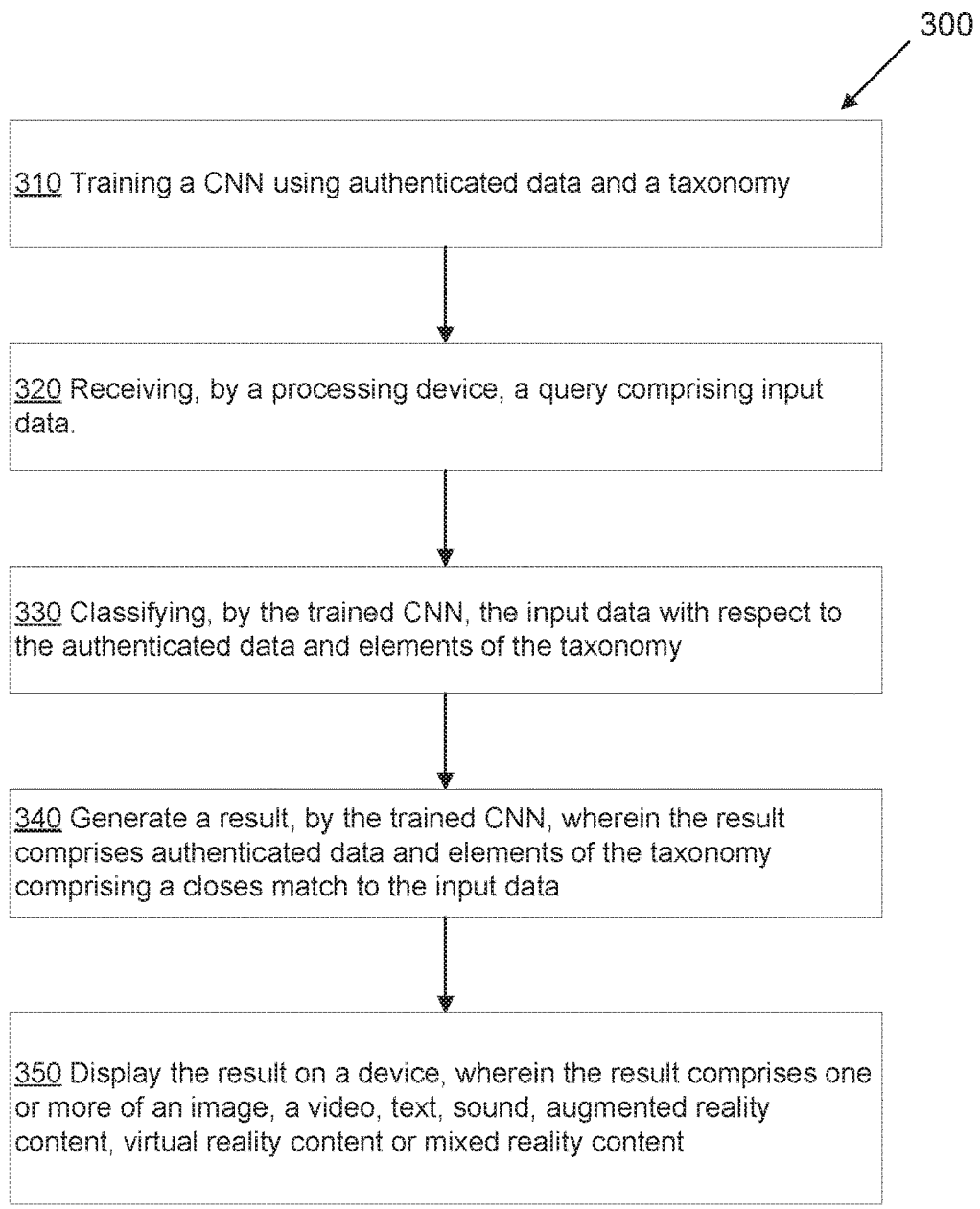
FIG. 3 depicts a flow diagram of one illustrative example of a method 300 of data processing and data analysis, in accordance with one or more aspects of the present disclosure.

FIG. 3 depicts a flow diagram of one illustrative example of a method 300 of classifying and identifying input data, in accordance with one or more aspects of the present disclosure. Method 300 and/or each of its individual functions, routines, subroutines, or operations may be performed by one or more processors of the computer system (e.g., system 100 and/or processing device 124 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the processing device performing the method may train a CNN using authenticated data and a taxonomy. In implementations, the authenticated data may include copyright registered works of authorship including, but not limited to, copyrighted images, videos, text, stories, sketches, etc. The authenticated data may be stored in a database and the database itself may be copyright registered. The taxonomy may be used to classify and identify the data assets.

At block 320, the processing device may receive a query comprising input data. The input data can include, but is not limited to, image data, video data, intake data and/or geo-location data according to embodiments herein. In implementations, the intake data may be in the form of a keyword or string of text or may be in the form of unstructured data such as natural language either typed or spoken. The method may further include training an RNN to process the unstructured data of the intake data to form structured data suitable for processing by the CNN. The CNN may then process the structured data.

At block 330, the processing device may classify, by the trained CNN, the input data with respect to the authenticated data and elements of the taxonomy. During the classification, the CNN may match features of the input data to one or more features of the authenticated data and/or elements of the taxonomy. For example, if the input data comprises an image, the CNN may scan the pixels of the image, identify features and then match the features with the closest matching features in the authenticated data and/or as classified in the taxonomy.

At block 340, the processing device may generate a result, by the trained CNN, wherein the result comprises authenticated data and elements of the taxonomy comprising a closest match to the input data. For example, if five features have probabilities of 80%, 82%, 90%, 95% and 99% of matching five assets of the authenticated data, respectively, then the returned result may include only images with features having a 90% or greater probability of matching the input data.

At block 350, the processing device may display the result on a device, wherein the result comprises one or more of an image, a video, text, sound, augmented reality content, virtual reality content and/or mixed reality content. In implementations, the result may be layered with information. For example, a displayed image may be annotated with text, video and/or historical information about an object in the image.

In another illustrative example of a method 300 of classifying and identifying input data, in accordance with one or more aspects of the present disclosure. a processing device performing the method may process a training data set comprising a plurality of input images, in order to determine one or more parameters of a CNN to be employed for processing a plurality of images of one or more vehicle and/or geographical location. In various illustrative examples, the parameters of the CNN may include the convolution filter values and/or the edge weights of the fully-connected layer. In an illustrative example, the plurality of input images comprises one or more vehicle image. The one or more vehicle image may illustrate a vehicle alone or in combination with a geographical location (e.g., a Ford Model T on Route 66).

The processing device performing the method optionally may process a training data set comprising unstructured data in order to determine one or more parameters of a RNN to be employed for processing unstructured data input to the media processing system 101 in the form of natural language queries and voice queries to produce structured data for the CNN. In various illustrative examples, the RNN is trained to perform natural language processing using, for example, unstructured written and/or voice inputs.

The media processing system 101 may receive one or more of: a) image data including at least one input image (e.g., of a vehicle and/or a geographical location), b) video data including at least one input video (e.g., of a vehicle and/or a geographical location), c) input data including at least one of a keyword, a search query and unstructured data (e.g., relating to a vehicle and/or a geographical location), and d) geographical location data including a location of a device. In an illustrative example, the media processing system 101 may receive an image of an automobile alone, or together with a voice request saying "show me the artistic design features of this car."

The processing device performing the method optionally may process, by the RNN of the media processing system 101, any unstructured data of the input data that is received. The RNN outputs structured data that is fed to the CNN for processing. In the foregoing illustrative example, the RNN may performing natural language processing of the voice request saying "show me the artistic design features of this car."

The processing device performing the method may process by the CNN of the media processing system 101, one or more of: i) the image data 110 to classify at least one input image (e.g., with respect to a vehicle information and/or a geographical location of a vehicle), ii) the video data 112 to classify at least one video (e.g., with respect to a vehicle information and/or a geographical location of a vehicle), iii) the structured input data 116 to classify at least one of a keyword or search query, iv) the structured data from the RNN (330), and v) the geographical location data 114 to produce one or more image, video and/or virtual display, as described in more herein. The probability of the image data, video data, geographical location data, input data and RNN data comprising the significant image features may be determined by a cross-entropy function, the error signal of which is directly proportional to a difference between desired and actual output values. In the foregoing illustrative example, the CNN may process the image of the automobile and the output of the RNN reflecting the voice request saying "show me the artistic design features of this car."

The processing device performing the method may generate a result by the media processing system including at least one of an image (e.g., of a vehicle and/or a geographical location), a video (e.g., of a vehicle and a geographical location), a history (e.g., of a vehicle and/or a geographical location) and/or other textual information. In the foregoing illustrative example, the media processing system 101 may generate an image of the automobile, alone or in combination with text providing the make, model and year of the automobile. The generated image may also be annotated with lines and text that identify artistic features of the automobile.

The processing device performing the method displays the result. The result may be displayed, for example, on a user device such as a cell phone, iPad, monitor or in a virtual device such as a head-mounted display of a virtual reality, augmented reality and/or mixed reality system.

Figure 4:
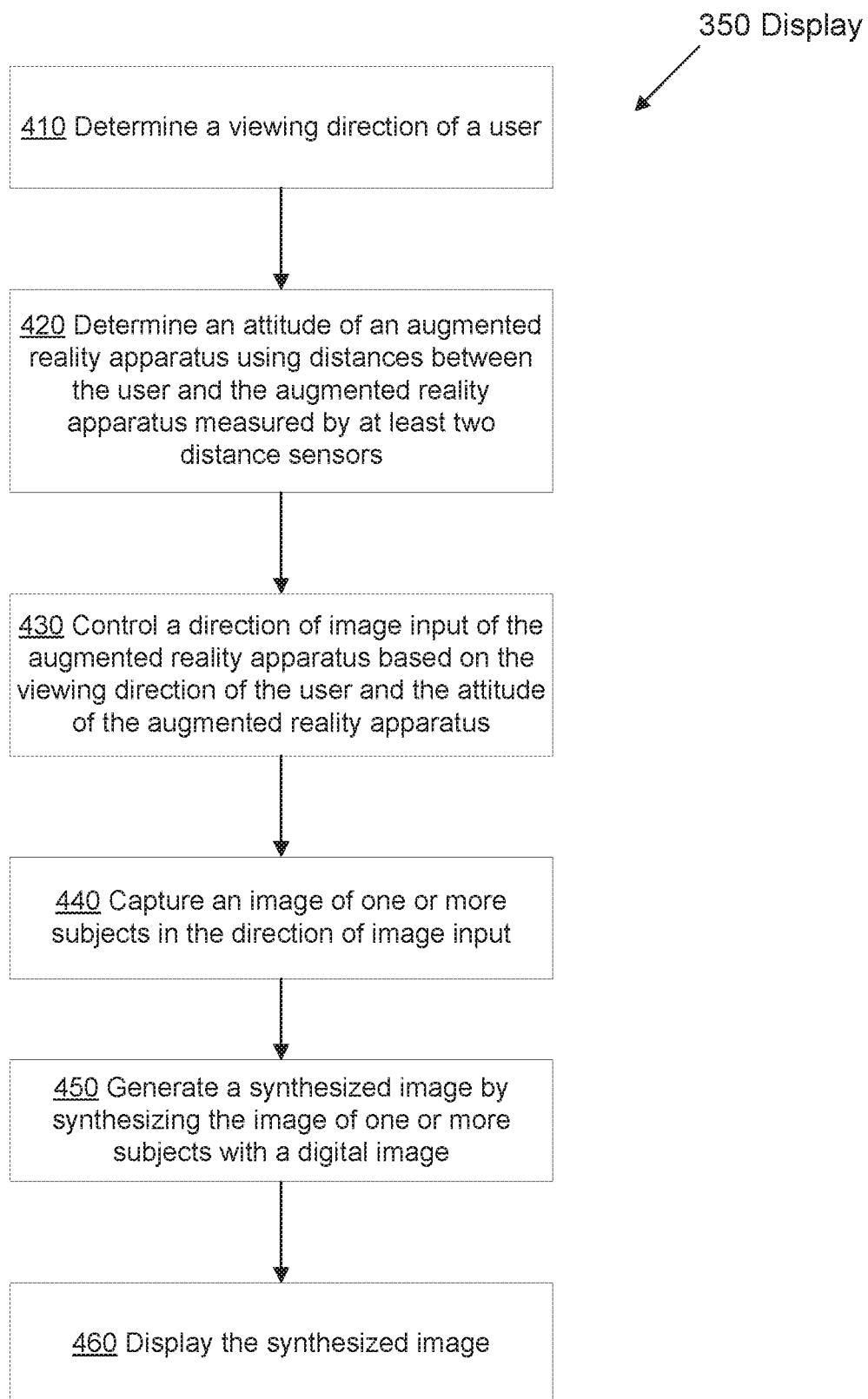
FIG. 4 depicts a flow diagram of one illustrative example of a method 360 of displaying via augmented reality a result from an example system for media classification and identification.

FIG. 4 depicts a flow diagram of one illustrative example of a method 360 of displaying a result, in accordance with one or more aspects of the present disclosure. Method 360 and/or each of its individual functions, routines, subroutines, or operations may be performed by one or more processors of the computer system (e.g., system 100 and/or processing device 124 of FIG. 1) executing the method. In certain implementations, method 360 may be performed by a single processing thread. Alternatively, method 360 may be performed by two or more processing threads, each thread executing one or more individual functions, routines, subroutines, or operations of the method. In an illustrative example, the processing threads implementing method 360 may be synchronized (e.g., using semaphores, critical sections, and/or other thread synchronization mechanisms). Alternatively, the processing threads implementing method 300 may be executed asynchronously with respect to each other.

Example method 360 produces an augmented reality display on a display device. At block 410, the processing device performing the method determines a viewing direction of a user wearing and augmented reality apparatus, for example, a head-mounted display. The viewing direction may be determined by angles in relation to a center of the head set (e.g., looking forward) and head position.

At block 420, the processing device performing the method determines an attitude of an augmented reality apparatus using distances between the user and the augmented reality apparatus. The distances may be measured by one or more distance sensors.

At block 430, the processing device performing the method controls a direction of image input of the augmented reality apparatus based on the viewing direction of the user and the attitude of the augmented reality apparatus. In an illustrative example, the augmented reality apparatus may include a driving unit that adjusts the direction of, for example, a digital camera horizontally or vertically so that a subject (e.g., a vehicle) corresponding to a subject image incident upon the digital camera can be chosen even when the augmented reality apparatus is fixed.

At block 440, the processing device performing the method receives an image of one or more subjects (e.g., a vehicle) in the direction of image input. A camera or other device for recording and storing images may be used to capture the image.

At block 450, the processing device performing the method generates a synthesized image by synthesizing the image of the one or more subjects with a digital image. In an illustrative example, the synthesized image will layer images, videos and text with the image of the one or more subjects to produce an augmented reality environment.

At block 460, the processing device performing the method displays the synthesized image. The synthesized image may be displayed on an augmented reality apparatus such as a head-mounted display. In an illustrative example, a user may see the image of a car captured using the user's cell phone underlaid by a video of geographical locations around the world. The image additionally or alternatively may be annotated with text such as arrows that point out different features of the car. The display may also be accompanied by voice information and/or music, for example, an audio description (e.g., spoken by a human or a bot) of the history of the car.

Figure 5:
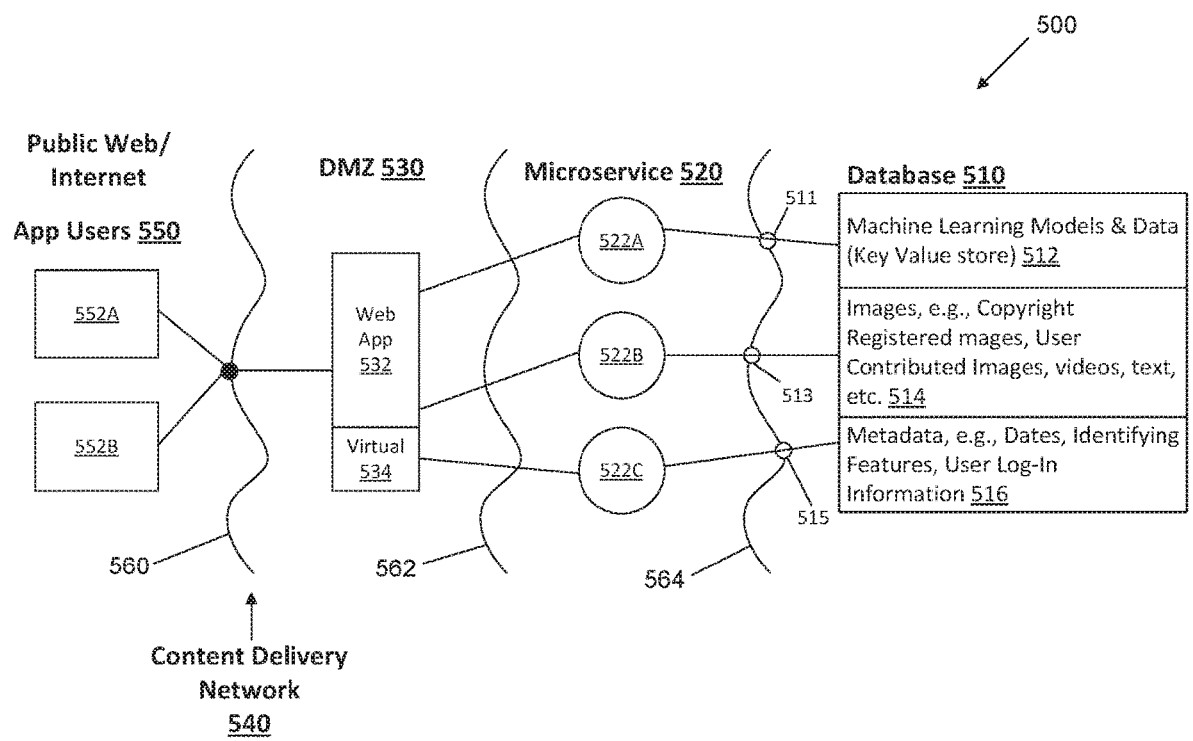
FIG. 5 depicts a diagram of a system for implementing the methods and systems described herein.

FIG. 5 schematically illustrates an example of the neural network architecture and data pipeline together with a cloud-based, microservices-driven architecture (collectively referred to as "the architecture") 500 for image processing and data analysis, in accordance with one or more aspects of the present disclosure. As schematically illustrated by FIG. 5, the architecture 500 includes a memory (not shown) and a database 510 (e.g., MongoDB©, Hbase©) configured for both in-memory and on-disk storage. The database 510 may include one or more trained machine learning models 512 for classifying and identifying images. In implementations, a storage or persistence layer may store images, metadata as a multidimensional cube warehouse, ML models, textual narratives, search-indexes, and software/applications underlying a transactional database. The architecture 500 may further include a plurality of containerized microservices 522A-C. In various example implementations, the runtime logic execution layer may be a collection of docker-container based microservices exposing representational state transfer (REST) application programming interfaces (APIs) (e.g., using Kubernetes18©). Each element 511, 513 and 515 represents a taxonomy feature that the corresponding microservice 522A, B and C is trained to analyze.

System 500 may further include a web application 532 including, for example, the media processing system 101 and system 100 and configured to execute methods 300 and 360. The web application 532 may be stored on a demilitarized zone (DMZ) network 530 to provide security. A virtual memory component 534 comprised of user comments and ratings may also be stored on the DMZ network 530 (i.e., these comments will not be added to the training data set 140 until authenticated). System 500 may further include a content delivery network 540, which is a content distribution network of proxy servers to ensure high availability of content. System 500 may further include a web presentation layer where one or more app users 550 can access the web app 532 and view results on a user device, for example, a cell phone 552A or a laptop 552B. In various example implementations, a presentation layer (e.g., ReactJS©) may be used for rendering the web-presentation layer (e.g., in 19 HTML5/CSS). The architecture may be implemented in a cloud or in a decentralized network (e.g., SOLID via Tim Berners-Lee).

The architecture 500 may further include digital walls 560, 562, 564 providing cybersecurity layers between the components of the architecture 500. Wall 560 may be implemented between the public web and application user devices 550 and the web application 532 and virtual component 534 in the DMZ 530. Wall 562 may be implemented between the DMZ 530 and microservices 520, 522A-C. Wall 564 may be implemented between the microservices 520 and the database 510.

According to various example implementations of the methods and systems described herein, CNN models may be implemented with multi-label classifiers to identify, for example, the make, mode, and year of manufacture of a vehicle. These classifiers may be implemented in, for example, TensorFlow® and Keras® using using ResNet, VGG-19 and/or Inception. In example implementations, these will feed into densely connected layers that predict into a region of an NLP embedding space. This embedding-space may then be used with NLP to identify relevant textual artifacts. According to example implementations, trained SNNs including CNNs may be used for vehicle authentication. The SNNs may use a contrastive loss function to compare a sample to a reference/fingerprint object.

According to various example implementations of the methods and systems described herein, RNN models may be implemented with LSTM, gated recurrent unit (GRU) and attention models. For example, the narratives users contribute, in addition those already curated as authentic history, will feed into NLP models based on RNN (LSTM/GRU) and Attention models like BERT, to assist a user in finding automobiles through descriptions. CNN-recognized objects and their associated meta-tags may play a role in the NLP results to map onto vehicles.

According to various implementations, the media processing system 101 may achieve greater than about 75% accuracy, or greater than about 80% accuracy, or greater than about 85% accuracy, or greater than about 90% accuracy, or greater than about 95% accuracy, or greater than about 99% accuracy when compared against the multi-label classifier. According to example implementations, an accuracy rate of greater than 90% may be achieved for cars that are more popular or common. For rarer cars, an accuracy rate of greater than about 80% may be achieved for vehicles that are less common or have limited production. In various example implementations, vehicle-clusters may be determined from broad descriptions. For example, when a user provides a broad description such as "Show me all Ford Mustangs," the media processing system 101 may provide a greater than 90% accuracy in identifying or recognizing the vehicle described when the text is sufficiently descriptive. For cultural heritage images, in various implementations the media processing system 101 may provide an accuracy of greater than about 80%, or greater than about 85%, or greater than about 90%, or greater than about 95%, or greater than about 99%. For example, the media processing system 101 may return a result with greater than about 80% probability of matching the query.

Figure 6:
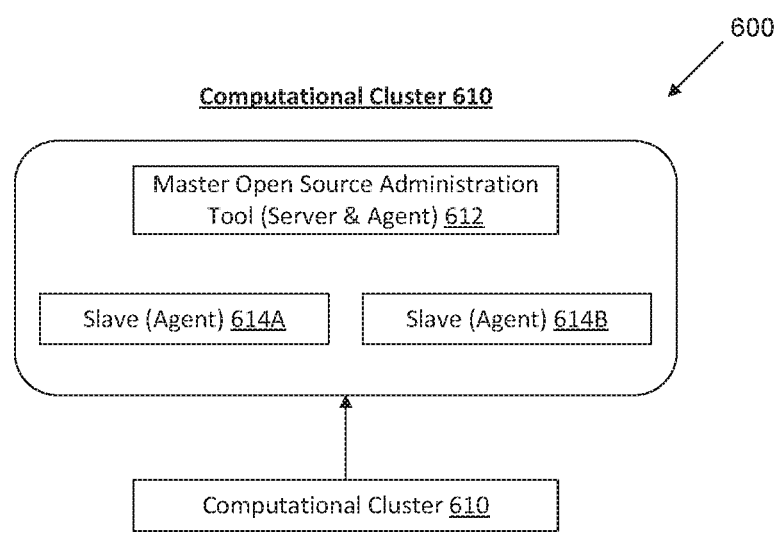
FIG. 6 depicts a diagram of a computational cluster system that may be employed in an example system for media classification and identification, in accordance with one or more aspects of the present disclosure.

FIG. 6 depicts a diagram of a server configuration 600 that may be employed in an example system for image processing and data analysis, in accordance with one or more aspects of the present disclosure. The server configuration 600 may be a computational cluster 610 (e.g., a Hadoop Cluster) having a master open source administration tool server and agent 612 (e.g., an Ambari server and Ambari agent). The computational cluster 610 may further include a pair of slave agents 614A-B. A Hadoop cluster is a type of computational cluster designed to store and analyze large quantities of unstructured data in a distributed computing environment. Such clusters run Hadoop's open source distributed processing software on low-cost commodity computers. The cluster enables many computers to solve problems requiring massive computation and data.

Figure 7:
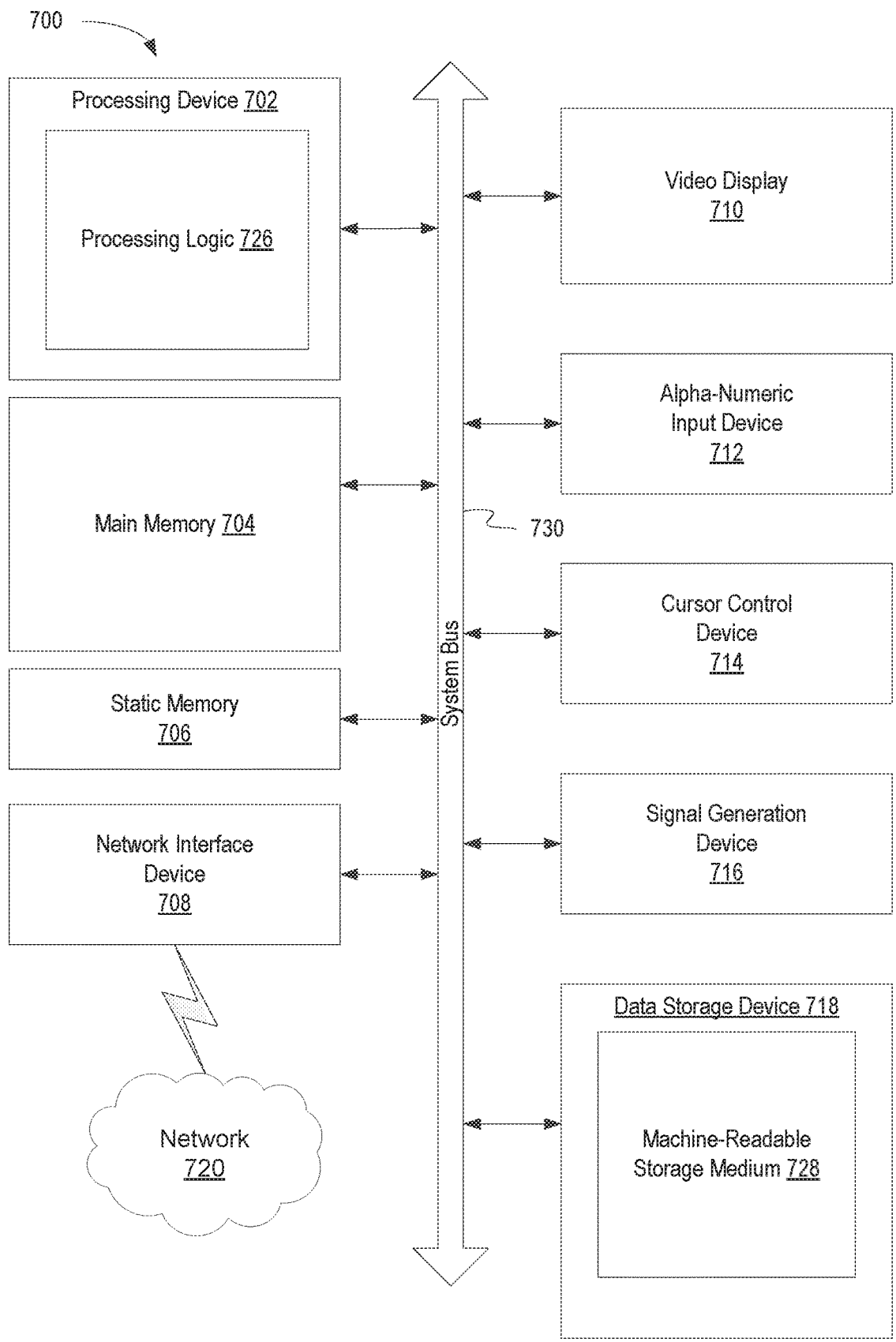
FIG. 7 depicts a diagram of an illustrative example of a computing device implementing the systems and methods described herein.

FIG. 7 illustrates a diagrammatic representation of a machine in the example form of a computer system 700 including a set of instructions executable by systems as described herein to perform any one or more of the methodologies discussed herein. In one implementation, the system may include instructions to enable execution of the processes and corresponding components shown and described in connection with FIGS. 1-6.

In alternative implementations, the systems may include a machine connected (e.g., networked) to other machines in a LAN, an intranet, an extranet, or the Internet. The machine may operate in the capacity of a server machine in client-server network environment. The machine may be a personal computer (PC), a neural computer, a set-top box (STB), Personal Digital Assistant (PDA), a cellular telephone, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies described herein.

The example computer system 700 can include a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the devices or systems described herein for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the devices and systems as described herein embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In various example implementations described herein, the neural networks are supervised learning models that analyze input data to classify objects, for example, using regression analysis. In an example implementation, a user may upload an image and the media processing system regresses it against many elements to determine the closest match. The supervised learning models are trained using different high-level elements of a taxonomy. The elements are related to categories of the taxonomy wherein the categories are used with ML to train the neural network models. In certain implementations, the elements may include, but are not limited to: actions (e.g., driving), concepts and emotions (e.g., direction), events (e.g., 2007 Tokyo Motor Show), geographic city (e.g., Los Angeles), geographic country (e.g., U.S.A.), geographic places (e.g., LAX Airport), geographic state (e.g., California), geographic location data (e.g., from a GPS), museum collections (e.g., Petersen Automotive Museum), photo environments (e.g., night), photo orientations (e.g., landscape), photo settings (e.g., auto garage), photo techniques (e.g., color), photo views (e.g., three-quarter front view), signs (e.g., bowling alley), topic subjects (e.g., American culture), vehicle coachbuilder (e.g., Brewster & Co.), vehicle color (e.g., green), vehicle condition (e.g., new), vehicle manufacturer (e.g., including country and continent of origin), vehicle model (e.g., Bentley 6½ Liter Speed Six Tourer), vehicle parts (e.g., 8-track cassette player), vehicle quantity (e.g., one object), vehicle serial number (e.g., Chassis 3559SA), vehicle type (e.g., hydrogen fuel cell) and vehicle year of manufacture (e.g., 1957).

Implementations described herein can preserve and reveal information about vehicles and their impact on society. Using machine learning (ML) algorithms trained upon a proprietary dataset of curated and authenticated photos (image data), videos (video data), input data (e.g., text or voice inputs) and geolocation data, an artificial intelligence (AI) platform (e.g., including one or more convolutional neural network and one ore more recurrent neural network) has been developed that can inter alia identify vehicles from 1885 through present day and engages users to annotate images of the vehicles by sharing stories and comments. Machine learning includes, but is not limited to algorithms that find and apply patterns in data. Neural networks can be a form of ML. Implementations described herein provide a kind of time machine chassis capturing alchemical memories of shaped metal propelled through time and space, then identified through a multi-layered neural network. Enabling society to easily access information about vehicles through a searchable media processing system as described herein, augments and preserves human narrative, future transportation solutions and the history of remarkable vehicles.

In implementations, the database upon which the neural network is trained is a transdisciplinary study where abstract concepts (e.g., emotional, verbal, spatial, logical, artistic and social) are represented by semantic keywords expressing different dimensions of intelligence present in the referenced media object. For example, "Art Deco" is a semantic artistic keyword found on numerous vehicles from the 1920s and 1930s due to the visual design-language shown on a particular car or artifact. Using deep learning, the neural networks as described herein can be repeatedly trained for each of these distinct conceptual layers of intelligence found in the media thus resulting in object recognition enhanced through semantic intelligence and linking back to society. Additional databases including engineering information, racing results, car shows, location a car has been exhibited, valuations, etc. can be layered upon the proprietary vehicle database to further enhance information relating to the vehicles. In implementations, users can, for example, page through every Chevrolet Corvette in the library archives and read or listen to entries associated with any vehicle. Similarly, in implementations, a user can experience the development of streamlining or see the condensed vehicle design language of a particular decade of time, e.g. The Fifties. In implementations, a user can hold up a mobile device to an interesting car on the street and learn its story through interaction with the media processing system. For example, the media processing system may be configured to return facts such as "Did you know the V8 engine was invented one hundred years ago?"

Implementations described herein are configured to recognize and identify vehicles input via multiple sensory inputs (e.g., voice, image and text) and record a user's personal stories about the provenance and significance of vehicles, for example, in telling the story of America. Families can upload shoeboxes of family photos to learn what vehicle a great-grandfather once drove to the Grand Canyon. A user can travel to a historic place site and through the media processing system view hundreds of vehicles and families that previously visited the site over preceding decades. In implementations, family vacation photographs recording an event can be layered upon an existing geographic location to create a virtual environment, for example, using an immersive augmented reality (AR). In implementations, the AR environment can enable a user to see herself or himself, along with his or her ancestors and their vehicles at the same cultural heritage site evoking a ghostly rapture within the time-space continuum. For example, "How many photographs with the family car were taken at the Golden Gate Bridge?"

According to implementations, a proprietary database of images of vehicles contains several labeled images that belong to different categories including, but not limited to "make," "model" and "year." "Vehicle" refers to a mechanism for transporting things (e.g., people and goods), including, but not limited to planes, trains, automobiles (e.g., cars, trucks, motorcycles, vans, etc.) and spacecraft. The more images used for each category, the better the model (e.g., the convolutional neural network) can be trained to determine whether an image is, for example, a Porsche image or a Ferrari image. This implementation utilizes supervised machine learning. The model can then be trained using the labeled known images. The images in their extracted forms enter the input side of the model and the labels are in the output side. The purpose is to train the model such that an image with its features coming from the input will match the label in the output. Once the model is trained, it can be used to recognize, classify and/or predict an unknown image. For example, a new image may be recognized, classified or predicted as a 1933 Packard Twelve. As part of the processing by the convolutional neural network, the newly input image also goes through the pixel feature extraction process.

Implementations disclosed herein can address a fundamental problem in the advertising industry: how to authenticate a users' interest in a particular automotive brand or vehicle model or type. By virtue of a user uploading an unidentified Alfa Romeo to the platform, the user self-identifies the user's interest in this vehicle brand. Through repeated interactions, the media processing system learns the user's interests in vehicle information. Such a feedback loop is valuable to advertisers for better targeting and in turn, can provide intelligence to manufacturers of future vehicles. The proprietary database of vehicles according to implementations, may be authenticated through timely registrations at the Library of Congress Copyright Office, which provides provenance that is preserved in the ML training dataset. In implementations, the training data set 140 may grow including additional data assets, for example, based on data input by users and/or additional assets that may not be copyright registered, but that may be authenticated, for example, by using SNNs as described herein.

Methods, systems and computer program products according to implementations herein relate to an AI platform built by systematically applying natural language processing (NLP) and computer vision, image and video processing to train a convolution and recurrent neural network from a dataset containing high quality, digital images, which may be copyrighted, of automobiles, capable of identifying a particular automobile from about 1885 through present day and into the future.

The essence of being human is to ask questions and AI seeks to provide credible information about a technological evolution: the journey of vehicles (e.g., the automobile), as well as the remaining surrounding artifacts of our vehicle heritage populating culture today. The implementations described herein provide an innovative AI-driven platform for classifying and documenting vehicles. Users can engage in a feedback cycle centered around identified photos, stories, comments, family photos and records. At their core, implementations herein nurture and explore the singular relationship of humans to machines, preserving the bond between the vehicles, design, community, architecture, engineering, history, government and culture to disseminate knowledge about vehicle culture. If a vehicle or important vehicle cultural heritage artifact is unknown, the platform can use the wisdom of crowds to identify and classify the asset. By NLP, the AI agent can begin chat interactions with the user about vehicles and immersive environments shown in the media thus deepening human-computer interaction skills.

Implementations described herein provide for the preservation and accessibility of collated, correlated and curated historical information (e.g., images, video, media, text, unstructured data, geographical location data, etc.) about and concerning vehicles, their use in human society, the environments (e.g., geographical locations) in which they are or have been used (e.g., racing and street), how they are or have been used, jobs they create or have created (e.g., in manufacturing and maintenance, consumer uses, collectors, etc.), technical and design features and special relationships with society.

According to implementations, multi-dimensional inputs query for vehicle attributes and elements from a vehicle dataset trained via ML from a proprietary reference database (e.g., a neural network) built-upon copyright-registered and authenticated intellectual property about vehicles and their environments from the 1880s through present day and into the future to provide AI in mixed reality applications. Information may be retrieved from implementations described herein using multiple inputs including, but not limited to, audio, text, video, images and global positioning system (GPS) inputs where the input request is referenced against a proprietary-trained vehicle dataset and returns a classification and/or match to the input request in mixed-reality environments. Queries about vehicles can be answered with a probability of correct identification. For example, a user can type into the media processing system: "Auto Union Wanderer W-25" and the system would interpret the words to return an image of the "Auto Union Wanderer W-25." The probability of the queried vehicle being built by "Auto Union" can be expressed as a percentage, for example, a "95%" probability of the image, video, text, history, etc. returned is an Auto Union and the probability of the image, video, text, history, etc. returned being a model "Wanderer W-25," for example, "85%." According to implementations, a short history of a vehicle appears and, using the geolocation services in the media processing system, an identification of where the closest example of this vehicle may be physically available for review relative to the user's present location.

In implementations, information can be retrieved by uploading to the system (e.g., an app on a cell phone, a website, etc.), via a user interface, a photograph (e.g., a digital image, a scanned image, etc.) of a vehicle the user may encounter in daily life (e.g., on the street, at a car show, etc.). Using image recognition derived from the proprietary database, the media processing system can return, for example, a matching identification and/or classification of a vehicle make, model and year of release (referred to herein as "year") with probabilities of accuracy based upon the trained dataset rendered through machine learning.

According to implementations described herein, users dictate voice request inputs, queries, text inputs and/or natural language to the media processing system. The input data can include, but is not limited to the make, model and year of a vehicle. For example, a user can speak "show me Ford Thunderbird" into a microphone that inputs data to the media processing system, which returns at least one of an image, a video, a written history, etc. representing the closest match to the "Ford Thunderbird" with additional information provided through mixed reality inputs. The user may refine a query by speaking "show me "red 1957 Ford Thunderbird" and the media processing system would return one or more image having the closest match together with a probability of accuracy. Existing platforms do not have provenance in their training data sets or information repositories (i.e., databases) and so the results returned by such platforms may be inaccurate or incomplete. Such platforms may scrape unauthenticated information (e.g., not copyright registered, not validated with date, author, metadata, etc.) from publicly available websites such that if a certain number of users say something is, for example, a Thunderbird, then the platform will agree. However, if an asset or image is merely a replica of a Thunderbird, then such information is missed in these existing platforms. In another example, multiple years of Honda Accords may not be able to be recognized with authority by existing platforms.

According to implementations, a user initiates a query by pointing an input device (e.g., a camera, a video recorder, etc.) at a vehicle of interest and the media processing system receives the at least one input image and/or input video and matches it against the ML trained dataset to provide an Augmented Reality (AR) display of information regarding the queried vehicle. Levels of information may be chosen via user setup. For example, a user may only require vehicle make, such as "Ferrari," or may require vehicle make and model, such as "Ferrari 250 GT," or may require technical information like engine type, such as "V-8 engines;" the application is configured to return images, videos and/or information that matches V-8 engines from the neural network of information. According to implementations, in each query result, additional educational information about the vehicle is provided depending upon user settings. A brief history of the car can be displayed or overlaid in a mixed reality environment. For example, a user can submit a text or natural language input query, such as "two-tone vehicle interiors," and matches to the requisition can be displayed on the user device with overlaid text depicting, for example, the make, model, history, design features, etc. of vehicles having two-tone interiors.

The implementations described herein are useful in a variety of fields, for example, where entities may need media assets or user information on vehicles obtainable from an organized, curated, and searchable platform. Example fields include, but are not limited to 1) advertisers: any automobile-related business or ads in which cars appear need authenticated product; 2) automobile manufacturers: marketing need for brand building, loyalty and heritage promotion of manufacturer's products/services; 3) insurers: verifying vehicles is key in protecting assets and individuals; 4) entertainment: immersive experiences through augmented/virtual reality, skill games; 5) law enforcement: need help in identification of vehicles involved in investigations, possibly from photos taken at/from a crime scene—e.g., by a bystander on his/her cell phone—and fraud detection; 6) vehicle designers: need access to historical examples and perspective for new designs; 7) travel: roadside support, fuel, lodging, food, interesting roads and points of interest along the roadside; 8) classic car market and collectors: buyers, sellers and restorers of vehicles need parts authenticity, provenance information, special features, and historical context in which the cars appear and are used; and 9) museums and archives: need help with identification, provenance and automotive history found in photo collections.

User interest, expressed by uploads of unidentified photos and by time spent reviewing certain vehicle brand archive sections to the media processing system, self-identifies the user's interest in specific vehicle brands and/or segments that can be sought after targets for advertisers. For example, a user who reads and peruses the Porsche archives is a good target for Porsche brand advertising.

By interacting with the platform, users self-identify interest in a particular automotive brand or vehicle sector thus solving an advertising problem for customers who wish to learn from past automotive designs, verify their illustrated marketing materials and target their communications to potential buyers in the automotive sector of our economy. Users may explore curated information about automobiles and roadside heritage through a virtual library linking other datasets to form a central integrated intelligence platform about automobiles and society. Transportation designers can easily access lessons learned from the last 135 years of automotive design.

Geolocation data, alone or in combination with curated photos of architectural and/or cultural heritage sites, can also be input to the media processing system as described herein. In certain implementations, the application can direct users to roadside services based on personalized user data (e.g., the user's preferred fuel type, fast food and hotel preferences can all be stored) and geolocation data received from a navigation system. For example, suppose a user drives a sports car, which is known from the user's profile stored in a memory accessible by the media processing system. The media processing system may have access to the user's calendar also stored on a memory accessible by the media processing system. The media processing system can receive an input from a navigation program indicating that the user's arrival at a calendar appointment location is estimated for 15 minutes, but there is a great two-lane road the user could drive that would be fun and would still get the user there on time for the calendar appointment. The media processing system would then suggest the alternate route.

Families throughout history have authenticated life in photographs, which may have been taken while on vacations using vehicles. Such image data can be used to virtually augment cultural heritage sites or historic places using historic photos including vehicles. For example, according to various implementations using augmented reality, virtual reality and/or mixed reality, the media processing system can enable users to virtually tour Route 66 throughout history. In implementations, the systems and methods described herein can use augmented, virtual and/or mixed reality to enhance travel and road trips. For example, a user may drive down Route 66 and, using geolocation data, hold up a device (e.g., a cell phone) and see the present location as it evolved through history within a virtual display device (e.g., a head mounted device).

According to implementations, augmented reality relating to vehicles can be used for cultural heritage tourism to enhance the tourist experience. Linking contextual information found in the backgrounds of family photos, provides the groundwork for creating an authenticated augmented reality system, for example, for America's historic places. For example, implementations described herein are useful for auto clubs such as AAA. A mobile device can be pointed at a vehicle and/or cultural heritage location to capture image data and/or geolocation data and the media processing system can return images of the vehicle and/or cultural heritage location over time at that particular location.

Embodiments of the present disclosure can be described in view of the following clauses. In clause 1, a method comprises: training a convolutional neural network (CNN) using authenticated data and a taxonomy; receiving, by a processing device, a query comprising input data; classifying, by the trained CNN, the input data with respect to the authenticated data and elements of the taxonomy; generating a result, by the trained CNN, wherein the result comprises authenticated data and elements of the taxonomy comprising a closest match to the input data; and displaying the result on a device, wherein the result comprises one or more of an image, a video, text, sound, augmented reality content, virtual reality content or mixed reality content.

In clause 2, the method of clause 1, wherein the authenticated data comprises copyright registered works of authorship, metadata and text. In clause 3, the method of clause 2, wherein the copyright registered works of authorship comprise one or more of images, video recordings, audio recordings, illustrations or writings. In clause 4, the method of clause 3, wherein the copyright registered works of authorship comprise one or more of vehicle information, geographical information or cultural information. In clause 5, the method of clause 1, wherein the authenticated data comprises data from a copyright registered database. In clause 6, the method of clause 1, wherein the elements of the taxonomy are selected from the group consisting of actions, concepts and emotions, events, geographic cities, geographic countries, geographic places, geographic states, geographic location data, museum collections, photo environments, photo orientations, photo settings, photo techniques, photo views, signs, topic subjects, vehicle coachbuilder, vehicle colors, vehicle conditions, vehicle manufacturers, vehicle models, vehicle parts, vehicle quantities, vehicle serial numbers, vehicle type and vehicle year of manufacture. In clause 7, the method of clause 1, wherein the input data comprises one or more of image data, video data, intake data or geographical location data. In clause 8, the method of clause 1, wherein classifying comprises mapping input data to authenticated data using the taxonomy. In clause 9, the method of clause 1, wherein the result comprises one or more of an image, a video, text, or sound. In clause 10, the method of clause 1, wherein generating the result yields one or more of vehicle information, vehicle artifact information or geographical information.

In clause 11, the method of clause 1, wherein generating the result yields a probability of the input data matching at least one feature of the authenticated data or of at least one element of the taxonomy. In clause 12, the method of clause 11, wherein the probability is determined by a cross-entropy function. In clause 13, the method of clause 1, wherein the result comprises augmented reality content, wherein displaying the result comprises: displaying the result in an augmented reality apparatus, comprising: passing light into an eye of a wearer of an augmented reality display device, said augmented reality display device comprising a light source and a waveguide stack comprising a plurality of waveguides; imaging the light at the display device; and displaying on the display device a vehicle alone or in combination with a geographical location and optionally, on a particular date, that has matching features to at least one of the image data, the video data, the input data and the geographical data. In clause 14, the method of clause 13, wherein displaying on the display device comprises at least one of displaying how the geographical location has changed over time, displaying history of vehicles that have passed through the geographical location over time, displaying weather conditions over a period of time. In clause 15, the method of clause 1, further comprising training a recurrent neural network (RNN) using authenticated data and a taxonomy. In clause 16, the method of clause 15, wherein the input data comprises unstructured data, the method further comprising: processing, by the trained RNN, the unstructured data to yield structured data; and classifying, by the trained CNN, the structured data. In clause 17, the method of clause 1, wherein the input data comprises user uploaded data, the method further comprising authenticating the user uploaded data using SNNs and adding the authenticated user uploaded data to the authenticated data.

In clause 18, a system comprising: a memory; a processor, coupled to the memory, the processor configured to: train a convolutional neural network (CNN) using authenticated data and a taxonomy; receive, by a processing device, a query comprising input data; classify, by the trained CNN, the input data with respect to the authenticated data and elements of the taxonomy; generate a result, by the trained CNN, wherein the result comprises authenticated data and elements of the taxonomy comprising a closest match to the input data; and display the result on a device, wherein the result comprises one or more of an image, a video, text, sound, augmented reality content, virtual reality content or mixed reality content. In clause 19, the system of clause 18, wherein the authenticated data comprises copyright registered works of authorship, metadata and text. In clause 20, the system of clause 19, wherein the copyright registered works of authorship comprise one or more of images, video recordings, audio recordings, illustrations or writings. In clause 21, the system of clause 20, wherein the copyright registered works of authorship comprise one or more of vehicle information, geographical information or cultural information. In clause 22, the system of clause 18, wherein the authenticated data comprises data from a copyright registered database. In clause 23, the system of clause 18, wherein the elements of the taxonomy are selected from the group consisting of actions, concepts and emotions, events, geographic cities, geographic countries, geographic places, geographic states, geographic location data, museum collections, photo environments, photo orientations, photo settings, photo techniques, photo views, signs, topic subjects, vehicle coachbuilder, vehicle colors, vehicle conditions, vehicle manufacturers, vehicle models, vehicle parts, vehicle quantities, vehicle serial numbers, vehicle type and vehicle year of manufacture. In clause 24, the system of clause 18, wherein the input data comprises one or more of image data, video data, intake data or geographical location data. In clause 25, the system of clause 18, wherein classifying comprises mapping input data to authenticated data using the taxonomy. In clause 26, the system of clause 18, wherein the result comprises one or more of an image, a video, text, or sound. In clause 27, the system of clause 18, wherein generating the result yields one or more of vehicle information, vehicle artifact information or geographical information. In clause 28, the system of clause 18, wherein generating the result yields a probability of the input data matching at least one feature of the authenticated data or of at least one element of the taxonomy. In clause 29, the system of clause 28, wherein the probability is determined by a cross-entropy function. In clause 30, the system of clause 18, wherein the result comprises augmented reality content, wherein displaying the result comprises: displaying the result in an augmented reality apparatus, comprising: passing light into an eye of a wearer of an augmented reality display device, said augmented reality display device comprising a light source and a waveguide stack comprising a plurality of waveguides; imaging the light at the display device; and displaying on the display device a vehicle alone or in combination with a geographical location and optionally, on a particular date, that has matching features to at least one of the image data, the video data, the input data and the geographical data. In clause 31, the system of clause 30, wherein displaying on the display device comprises at least one of displaying how the geographical location has changed over time, displaying history of vehicles that have passed through the geographical location over time, displaying weather conditions over a period of time. In clause 32, the system of clause 18, further configured to train a recurrent neural network (RNN) using authenticated data and a taxonomy. In clause 33, the method of clause 32, wherein the input data comprises unstructured data, the method further comprising: processing, by the trained RNN, the unstructured data to yield structured data; and classifying, by the trained CNN, the structured data. In clause 34, the method of clause 18, wherein the input data comprises user uploaded data, wherein the system is further configured to authenticate the user uploaded data using SNNs and add the authenticated user uploaded data to the authenticated data.

In clause 35, a computer-readable non-transitory storage medium comprising executable instructions that, when executed by a computing device, cause the computing device to perform operations comprising: training a convolutional neural network (CNN) using authenticated data and a taxonomy; receiving, by a processing device, a query comprising input data; classifying, by the trained CNN, the input data with respect to the authenticated data and elements of the taxonomy; generating a result, by the trained CNN, wherein the result comprises authenticated data and elements of the taxonomy comprising a closest match to the input data; and displaying the result on a device, wherein the result comprises one or more of an image, a video, text, sound, augmented reality content, virtual reality content or mixed reality content. In clause 36, the computer-readable non-transitory storage medium of clause 35, wherein the authenticated data comprises copyright registered works of authorship, metadata and text. In clause 37, the computer-readable non-transitory storage medium of clause 36, wherein the copyright registered works of authorship comprise one or more of images, video recordings, audio recordings, illustrations or writings. In clause 38, the computer-readable non-transitory storage medium of clause 37, wherein the copyright registered works of authorship comprise one or more of vehicle information, geographical information or cultural information. In clause 39, the computer-readable non-transitory storage medium of clause 35, wherein the authenticated data comprises data from a copyright registered database. In clause 40, the computer-readable non-transitory storage medium of clause 35, wherein the elements of the taxonomy are selected from the group consisting of actions, concepts and emotions, events, geographic cities, geographic countries, geographic places, geographic states, geographic location data, museum collections, photo environments, photo orientations, photo settings, photo techniques, photo views, signs, topic subjects, vehicle coachbuilder, vehicle colors, vehicle conditions, vehicle manufacturers, vehicle models, vehicle parts, vehicle quantities, vehicle serial numbers, vehicle type and vehicle year of manufacture. In clause 41, the computer-readable non-transitory storage medium of clause 35, wherein the input data comprises one or more of image data, video data, intake data or geographical location data. In clause 42, the computer-readable non-transitory storage medium of clause 35, wherein classifying comprises mapping input data to authenticated data using the taxonomy. In clause 43, the computer-readable non-transitory storage medium of clause 35, wherein the result comprises one or more of an image, a video, text, or sound. In clause 44, the computer-readable non-transitory storage medium of clause 35, wherein generating the result yields one or more of vehicle information, vehicle artifact information or geographical information. In clause 45, the computer-readable non-transitory storage medium of clause 35, wherein generating the result yields a probability of the input data matching at least one feature of the authenticated data or of at least one element of the taxonomy. In clause 46, the computer-readable non-transitory storage medium of clause 45, wherein the probability is determined by a cross-entropy function. In clause 47, the computer-readable non-transitory storage medium of clause 35, wherein the result comprises augmented reality content, wherein displaying the result comprises: displaying the result in an augmented reality apparatus, comprising: passing light into an eye of a wearer of an augmented reality display device, said augmented reality display device comprising a light source and a waveguide stack comprising a plurality of waveguides; imaging the light at the display device; and displaying on the display device a vehicle alone or in combination with a geographical location and optionally, on a particular date, that has matching features to at least one of the image data, the video data, the input data and the geographical data. In clause 48, the computer-readable non-transitory storage medium of clause 47, wherein displaying on the display device comprises at least one of displaying how the geographical location has changed over time, displaying history of vehicles that have passed through the geographical location over time, displaying weather conditions over a period of time. In clause 49, the computer-readable non-transitory storage medium of clause 35, further comprising training a recurrent neural network (RNN) using authenticated data and a taxonomy. In clause 50, the computer-readable non-transitory storage medium of clause 49, wherein the input data comprises unstructured data, the method further comprising: processing, by the trained RNN, the unstructured data to yield structured data; and classifying, by the trained CNN, the structured data. In clause 51, the computer-readable non-transitory storage medium of clause 35, wherein the input data comprises user uploaded data, the method further comprising authenticating the user uploaded data using SNNs and adding the authenticated user uploaded data to the authenticated data. In clause 52, the medium of clause 51, wherein processing by the CNN at least one of the image data, the video data, the input data and the geographical location data yields one or more image of a vehicle comprising matching features.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "rating," "selecting," "comparing," "adjusting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description.

I claim:

1. A method adapted for processing multimodal input data based upon multimodal and/or multiclass training data, the method comprising:
   training, by a processor, a convolutional neural network (CNN) using the multimodal and/or multiclass training data, which includes authenticated data and a taxonomy, to classify at least one data object in a media asset, authenticate the media asset received by the CNN, and verify the data object received by the CNN;
   training, by a processor, a recurrent neural network (RNN) using the multimodal and/or multiclass training data;
   receiving, by the processor, a query comprising input data;
   classifying, by the trained CNN, the input data with respect to the authenticated data and elements of one or more classes of the taxonomy;
   generating a result, by the trained CNN, wherein the result comprises authenticated data and elements of one or more classes of the taxonomy comprising a closest match to the input data; and
   displaying the result on a device, wherein the result comprises one or more of an image, a video, text, sound, augmented reality content, virtual reality content or mixed reality content.

2. The method of claim 1, wherein the authenticated data comprises copyright registered works of authorship, metadata and text.

3. The method of claim 2, wherein the copyright registered works of authorship comprise one or more of images, video recordings, audio recordings, illustrations and/or writings.

4. The method of claim 3, wherein the copyright registered works of authorship comprise one or more of vehicle information, geographical information or cultural information.

5. The method of claim 1, wherein the authenticated data comprises data from a copyright registered database.

6. The method of claim 1, wherein the one or more classes of the taxonomy are selected from the group consisting of actions, concepts and emotions, events, geographic cities, geographic countries, geographic places, geographic states, geographic location data, museum collections, photo environments, photo orientations, photo settings, photo techniques, photo views, signs, topic subjects, vehicle coachbuilder, vehicle colors, vehicle conditions, vehicle manufacturers, vehicle models, vehicle parts, vehicle quantities, vehicle serial numbers, vehicle type and vehicle year of manufacture.

7. The method of claim 1, wherein the input data comprises one or more of image data, video data, intake data or geographical location data.

8. The method of claim 1, wherein classifying comprises mapping input data to authenticated data using the taxonomy.

9. The method of claim 1, wherein the result comprises one or more of an image, a video, text, or sound.

10. The method of claim 1, wherein generating the result yields one or more of vehicle information, vehicle artifact information or geographical information.

11. The method of claim 1, wherein generating the result yields a probability of the input data matching at least one feature of the authenticated data or of at least one element of the taxonomy.

12. The method of claim 11, wherein the probability is determined by a cross-entropy function.

13. The method of claim 1, wherein the result comprises augmented reality content, wherein displaying the result comprises:
   displaying the result in an augmented reality apparatus, comprising:
      passing light into an eye of a wearer of an augmented reality display device, said augmented reality display device comprising a light source and a waveguide stack comprising a plurality of waveguides;
      imaging the light at the display device; and
      displaying on the display device a vehicle alone or in combination with a geographical location and optionally, on a particular date, that has matching features to at least one of the image data, the video data, the input data and the geographical data.

14. The method of claim 13, wherein displaying on the display device comprises at least one of displaying how the geographical location has changed over time, displaying history of vehicles that have passed through the geographical location over time, displaying weather conditions over a period of time.

15. The method of claim 1, further comprising:
   a deep learning module including neural memory, and/or
   a transformer, alone or in combination with the RNN to process attention models.

16. The method of claim 1, wherein the input data comprises unstructured data, the method further comprising:
   processing, by the RNN, the unstructured data to yield structured data; and
   classifying, by the CNN, the structured data.

17. The method of claim 1, wherein the input data comprises user uploaded data, the method further comprising authenticating the user uploaded data using Siamese Neural Networks and adding the authenticated user uploaded data to the authenticated data.

18. A system adapted for processing multimodal input data based upon multimodal and/or multiclass training data, the system comprising:
   a memory;
   a processor, coupled to the memory, the processor configured to:
      train a convolutional neural network (CNN) using the multimodal and/or multiclass training data including authenticated data and a taxonomy to classify at least one data object in a media asset, authenticate the media asset received by the CNN, and verify the data object received by the CNN;
      train a recurrent neural network (RNN) using the multimodal and/or multiclass training data;
      receive, by the processor, a query comprising input data;
      classify, by the trained CNN, the input data with respect to the authenticated data and elements of one or more classes of the taxonomy;
      generate a result, by the trained CNN, wherein the result comprises authenticated data and elements of one or more classes of the taxonomy comprising a closest match to the input data; and display the result on a device, wherein the result comprises one or more of an image, a video, text, sound, augmented reality content, virtual reality content or mixed reality content.

19. The system of claim 18, wherein the authenticated data comprises copyright registered works of authorship, metadata and text.

20. A computer-readable non-transitory storage medium comprising executable instructions that, when executed by a computing device, cause the computing device to perform operations, adapted for processing multimodal input data based upon multimodal and/or multiclass training data, comprising:

training a convolutional neural network (CNN) using multimodal and/or multiclass training data, which includes authenticated data and a taxonomy, to classify at least one data object in a media asset, authenticate the media asset received by the CNN, and verify the data object received by the CNN;

training a recurrent neural network (RNN) using the multimodal and/or multiclass training data;

receiving a query comprising input data;

classifying, by the trained CNN and/or the RNN, the input data with respect to the authenticated data and elements of one or more classes of the taxonomy;

generating a result, by the trained CNN and/or the RNN, wherein the result comprises authenticated data and elements of one or more classes of the taxonomy comprising a closest match to the input data; and displaying the result on a device, wherein the result comprises one or more of an image, a video, text, sound, augmented reality content, virtual reality content or mixed reality content.

* * * * *